Sept. 1, 1953 W. H. TANKE 2,650,529
TRACTOR PLOW AFFORDING ADJUSTABLE WIDTH OF CUT
Filed Oct. 1, 1951 2 Sheets-Sheet 1

Inventor
Willard H. Tanke
by Kimball S. Wyman
Attorney

Sept. 1, 1953 W. H. TANKE 2,650,529
TRACTOR PLOW AFFORDING ADJUSTABLE WIDTH OF CUT
Filed Oct. 1, 1951 2 Sheets-Sheet 2
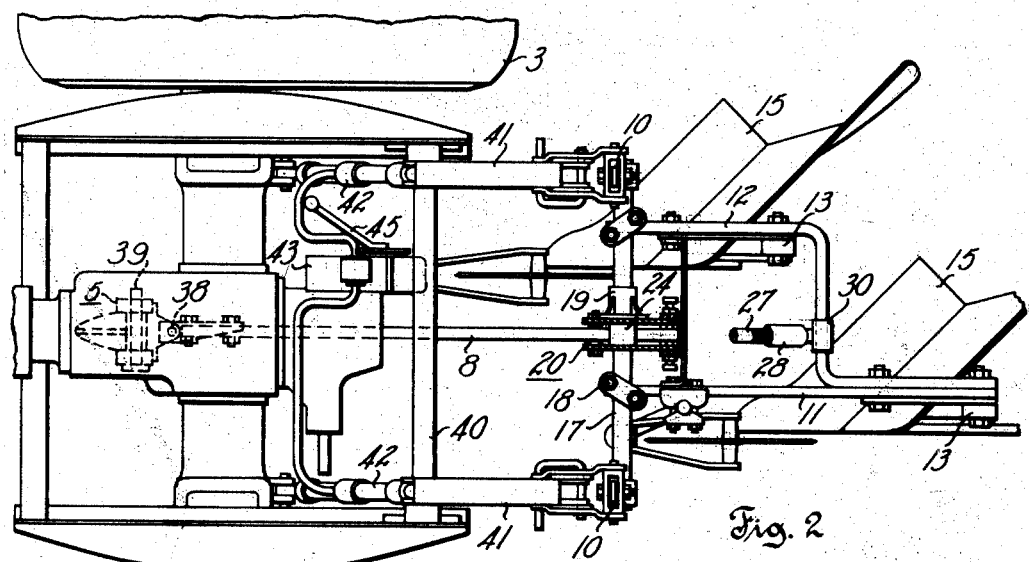

Patented Sept. 1, 1953

2,650,529

UNITED STATES PATENT OFFICE 2,650,529

TRACTOR PLOW AFFORDING ADJUSTABLE WIDTH OF CUT

Willard H. Tanke, La Crosse, Wis., assignor to Allis-Chalmers Manufacturing Company, Milwaukee, Wis.

Application October 1, 1951, Serial No. 249,190

6 Claims. (Cl. 97—47.51)

This invention relates generally to agricultural implements and is more particularly directed to a rear attached tractor mounted plow including means affording lateral adjustment thereof relative to the tractor.

In the mounting of a rear attached plow on a tractor it is desirable that lateral adjustment be afforded for the plow bottom relative to the center of pull on the tractor in order that the best possible plowing results may be achieved. Experimentation with plows, including a study of the forces acting thereon during operation, has indicated that the center of pull is always midway between the drive wheels of the tractor and that the most efficient plowing is done when the center of resistance of the plow to the forces thereon is laterally offset with respect to a longitudinal center line through the center of pull in the direction of travel. In other words, a line drawn through the center of pull on the tractor and the center of resistance of the plow is angularly disposed with respect to the longitudinal axis of the tractor when the plow is properly hitched. The magnitude of the angularity just mentioned may vary with the structure involved and the soil conditions and may best be determined by an actual trial operation of the plow in the field. It is also to be noted that the mentioned lateral adjustment affects not only the balance of forces on the plow but, also, the width of cut of the plow bottom. Consequently, it is highly desirable that ready and accurate field adjustment of the lateral position of the plow be afforded.

Accordingly, it is a primary object of the present invention to provide a close coupled rear attached tractor plow with new and improved structure affording ready lateral adjustment of the plow bottoms relative to the center of pull on the tractor and including separate means affording increment adjustment of the draft means with respect to the plow.

A further object of this invention is to provide a tractor rear mounted plow having a forwardly extending pull bar adapted at its forward end for connection with the tractor and detachably joined at its rearward end portion to the plow structure in a novel and improved manner affording increment horizontally angular adjustment of the pull bar relative to the plow structure.

Still another object of this invention is the provision of a plow of the type referred to above wherein the plow supporting frame is detachably secured at its forward end to a transverse lift bar for adjustment laterally therealong, and wherein a forwardly extending pull bar, adapted for attachment at its forward end to the tractor, is detachably adjustably secured at its rearward end to a hitch part secured to the transverse lift bar for lateral adjustment therealong.

The construction and operation of the apparatus involved will become more readily apparent as the disclosure progresses and particularly points out the various features of this invention. Accordingly, the present invention may be considered as comprising the various constructions, combinations, and/or subcombinations of parts as is hereinafter more fully set forth in the detailed description and appended claims, reference being had to the accompanying drawings in which:

Fig. 2 is a plan view of a portion of the structure shown in Fig. 1;

Fig. 3 is an enlarged plan view of the pull bar with the overlying supporting structure for the rear end thereof broken away in the interest of clarity;

Fig. 4 is a partial vertical section taken on line IV—IV of Fig. 1; and

Fig. 5 is a partial horizontal section taken on line V—V of Fig. 1.

Figure 1:
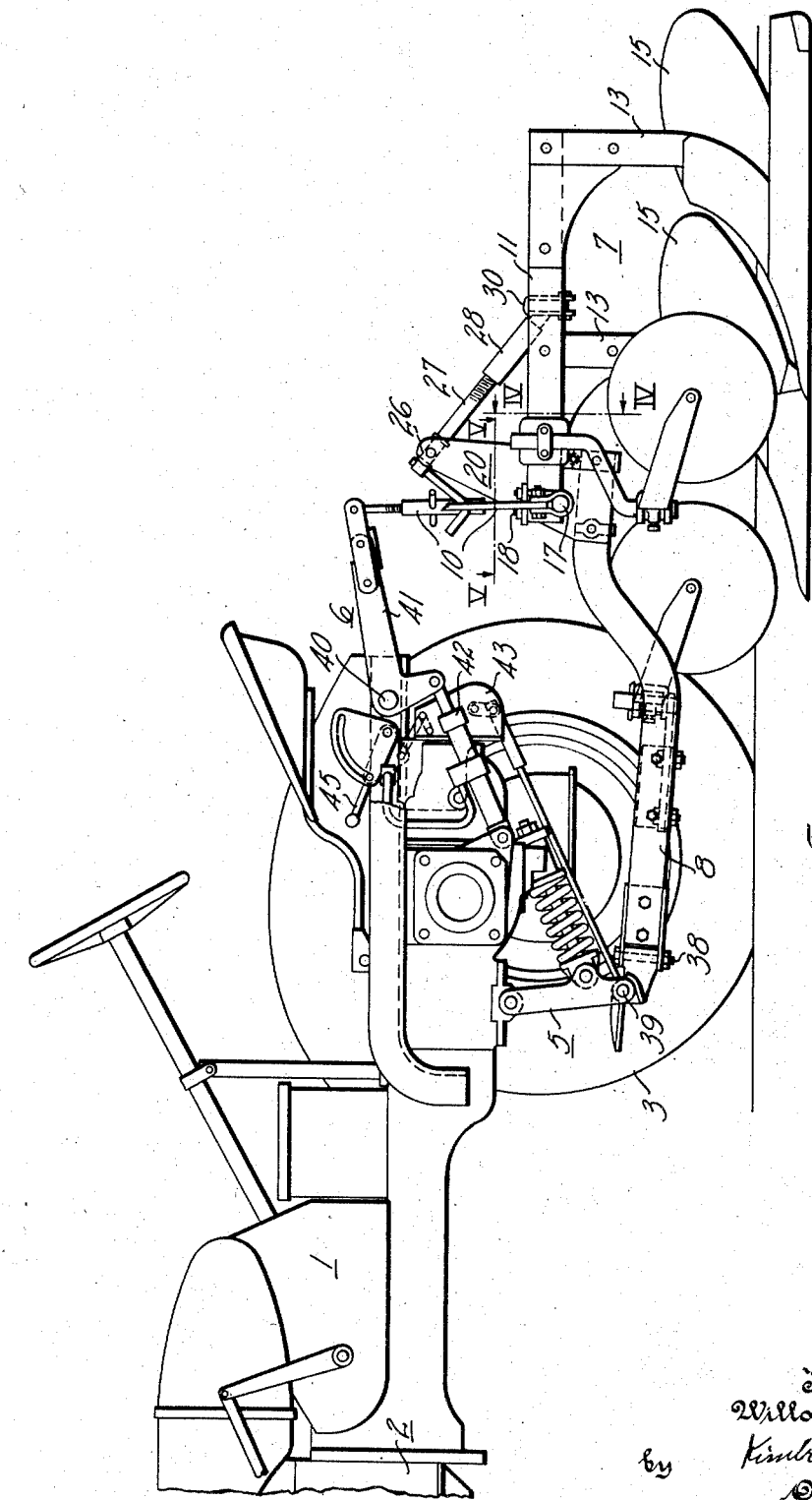
Fig. 1 is a side view of a tractor implement combination embodying the subject invention, with the near traction wheel removed to more clearly show the structure involved.

Referring particularly to Fig. 1, it is seen that apparatus embodying the present invention comprises generally a conventional wheel type tractor 1 having an engine 2 for propelling a pair of drive wheels 3, a hitch means 5 for attaching an implement to the tractor, and having a lift means 6 disposed on the rear of the tractor. A two bottom moldboard plow 7 having a forwardly extending draft device or pull bar 8 connected with hitch means 5 on the tractor is disposed in close coupled relation to the tractor with lift links 10 affording connection between the plow and lift means 6 on the tractor.

More specifically, plow 7 includes a plow supporting frame comprising generally parallel side members or beams 11 and 12 with the latter bent, at an intermediate point, inwardly and at right angles to the parallel beam portions to terminate in a rearwardly extending portion which is secured to beam 11 in side abutting relation thereto. Vertical stub members 13 are fixedly secured in depending relation to beams 11 and 12, respectively, in laterally and longitudinally spaced relation with respect to each other, and each of these stub members mounts a conventional moldboard plow 15.

The forward underside end portions of plow beams 11 and 12 are preferably notched at 16 to receive a transverse lift bar 17 which is detachably secured in laterally adjustable relation to the plow frame through U-bolts 18. The portion of lift bar 17 intermediate the plow beams mounts a rigid structure 20 comprising a pair of vertically disposed parallel plate members 21 and 22 which include aligned openings therethrough to receive the lift bar in rotatable and axially movable relation. Plates 21 and 22 are preferably maintained in spaced relation by spacer elements 23 detachably secured in position at upper and lower portions of the plates by bolts 25. Furthermore, the plates are maintained in laterally adjustable fixed position on lift bar 17 by means of a set collar 24 positioned on the lift bar between plate members 21 and 22. In addition, plate 21 includes a bar receiving hub portion 19 which extends outwardly therefrom and may be detachably secured thereto by the bolts 25.

The upper ends of plates 21 and 22 have detachably supported therebetween a trunnion 26 rotatably receiving a beaming crank or screw 27 which is threaded at its rearward end for engagement with an internally threaded anchor 28 pivotally secured to a yoke 30 fixed on the transverse portion of plow beam 12 in laterally adjustable relation thereto. Actuation of crank 27 effects a beaming adjustment of plow 7, i. e. a variation in the vertical angle between structure 20 and the beams 11 and 12.

The lower portions of plates 21 and 22 extend below lift bar 17 to afford means for attaching pull bar 8 thereto. The pull bar has a transverse opening 31 therethrough at its rearward end portion which is alignable with a pair of openings in plate members 21 and 22 and a bolt 32 is inserted through the openings in the plates and bar to pivotally secure the pull bar to the plate members. Opening 31 in pull bar 8 is preferably made somewhat larger than necessary to receive bolt 32 in order that the pull bar may be laterally pivoted with respect to the axis of bolt 32. Spacer blocks 33, having convex portions with an opening therethrough, are preferably arranged on bolt 32 between pull bar 8 and each of the plate members to permit the aforementioned lateral pivotal movement of pull bar 8. The rear end portion of pull bar 8 is held against downward movement relative to plate members 21 and 22 by means of a yoke member 35 fixedly secured to the lower rear portions of the plates, as by one of the bolts 25 through the spacer element 23 at the rear of the plates, with the bight portion of the yoke supporting bar 8. Upward movement of the rear end of the pull bar is prevented by means of a spacer block 36 interposed between the overlying spacer element 23 and the upper edge of pull bar 8.

It is to be noted that the spacing of plate members 21 and 22 is greater than the width of pull bar 8 and, consequently, there is afforded the above mentioned lateral pivotal movement of the pull bar about bolt 32. In order to limit this lateral movement of pull bar 8 and, also, provide means for adjusting the horizontal angular position of the pull bar relative to the plow structure there is provided a pair of set screws 37 which are threadably received in plate members 21 and 22, respectively, and extend therethrough to engage opposite side portions of the rearward end of the pull bar. Consequently, by axially adjusting the position of set screws 37 pull bar 8 may be laterally pivoted about bolt 32. This change in the angular position of the pull bar relative to the plow structure affects the angular relationship of the moldboards relative to the direction of travel and, consequently, results in a change in the width of cut of the plow.

The forward end portion of pull bar 8 is provided with suitable means for connection with hitch means 5 on the tractor. This is preferably a hitch connection affording universal movement of the pull bar with respect to the tractor such as is afforded in the construction shown in Fig. 1 wherein bolt 38 affords horizontal pivotal movement of the pull bar and pin 39 affords vertical pivotal movement of pull bar 8 relative to the tractor.

For lifting and lowering the plow structure there is provided a lift mechanism 6 on the tractor comprising a transverse rock shaft 40 rotatably mounted on the rear of the tractor and having a pair of lift arms 41 in the form of bell cranks fixed to rock shaft 40 for rotation therewith in laterally spaced relation, a pair of rams 42 operably connected with the lift arms 41 for actuation thereof, and a hydraulic pump 43 driven from the tractor engine and controllable through a lever 45 on the tractor. Lift links 10, which are pivotally connected at one end to lift bar 17 of the plow structure, are connected with the free end portions of lift arms 41 on the tractor. And in this connection it will be noted that the right lift link includes a turnbuckle arrangement which affords vertical movement of the associated end of lift bar 17 relative to the opposite end of the bar to thereby adjust the winging or lateral tilt of the plow. Since the lift mechanism forms no material part of the present invention, it is believed that a further description thereof is unnecessary.

In addition, features of the colter combination and hitch means herein shown and/or described, but not claimed, have been made the basis of separate copending applications, Ser. No. 248,116, filed September 5, 1951, by Willard H. Tanke and John W. Mydels, for Tractor Plow, and Ser. No. 254,347, filed November 1, 1951, by Willard H. Tanke and Robert S. Reaves, for Plow Hitch, respectively.

It should be apparent from the foregoing description that the described structure affords a lateral adjustment of the plow bottoms relative to the point of hitch on the tractor, through loosening U-bolts 18 and shifting of the beam structure along lift bar 17, and, also, affords a shifting or lateral adjustment of the pull bar relative to the plow bottoms through shifting of part 20 along lift bar 17 and/or adjustment of set screws 37 to angularly shift the pull bar in a horizontal direction with respect to the plow structure. Consequently, in adjusting the plow for proper operation, particularly with respect to the angle of pull and the width of cut, there is provided easily operable means for achieving a general adjustment and, also, precision means in the form of set screws 37 for accomplishing an exact adjustment of the lateral position of the plows.

And, although shown and described with respect to a particular arrangement for mounting a two bottom plow, it should be understood that the invention is not limited to such an arrangement, as various modifications within the scope of the appended claims may occur to persons skilled in the art.

It is claimed and desired to secure by Letters Patent:

1. A rear attached tractor carried implement comprising a transverse lift bar presenting opposite ends adapted for connection with a pair of laterally spaced tractor carried lift arms, a rigid plow supporting frame comprising laterally spaced forward beam portions secured to an intermediate portion of said lift bar for lateral adjustment therealong, a rigid part fixedly secured to a portion of said lift bar intermediate said forward beam portions for lateral adjustment relative thereto, and a forwardly extending generally rigid pull bar presenting a forward end adapted for connection with a tractor and having its rear end secured in fixed vertical relation to a portion of said part through means affording limited horizontal angular shifting of the rear end of said pull bar relative to said part.

2. An implement as set forth in claim 1, wherein said rigid part comprises a pair of laterally spaced members, said rear end portion of said pull bar is disposed between said laterally spaced members and secured thereto through means affording relative horizontal angular movement of said bar with respect to said members, and wherein additional means carried by said members fixedly secures said bar in any selected angular position relative to said members.

3. A rear attached tractor carried implement comprising a transverse lift bar presenting opposite ends adapted for connection with a pair of laterally spaced tractor carried lift arms, a rigid plow supporting frame comprising laterally spaced parallel forward beam portions secured to an intermediate portion of said lift bar for lateral adjustment therealong, a rigid part fixedly secured to a portion of said lift bar intermediate said forward beam portions to extend above said bar and for lateral adjustment therealong, a longitudinally adjustable beaming member having its rear end pivotally connected with said frame and its forward end pivotally connected with a portion of said part above said lift bar, and a forwardly extending generally rigid pull bar presenting a forward end adapted for connection with a tractor and having its rear end secured in fixed vertical relation to a portion of said part through means affording limited horizontal angular shifting of the rear end of said pull bar relative to said part.

4. A rear attached tractor carried implement comprising a transverse lift bar presenting opposite ends adapted for connection with a pair of laterally spaced tractor carried lift arms, a rigid implement frame comprising laterally spaced parallel forward beam portions secured to an intermediate portion of said lift bar for lateral adjustment therealong, a pair of plow bottoms secured to said frame in laterally spaced and longitudinally staggered relation with their points disposed in underlying generally longitudinal alignment with respect to said forward beam portions, a rigid part fixedly secured to a portion of said lift bar intermediate said forward beam portions to extend above and below said bar and for adjustment longitudinally thereof, a longitudinally adjustable beaming member having its rear end pivotally connected with said frame for adjustment laterally thereof and having its other end pivotally connected with a portion of said part above said lift bar, a forwardly extending generally rigid pull bar adapted for connection with the tractor and having its rear end secured to said part below said lift bar in vertically fixed relation through means affording limited horizontal angular shifting of the rear end of said pull bar relative to said part.

5. A rear attached tractor carried implement comprising a transverse lift bar presenting opposite ends adapted for connection with a pair of laterally spaced tractor carried lift arms, a rigid plow supporting frame comprising laterally spaced parallel forward beam portions secured to an intermediate portion of said lift bar for lateral adjustment therealong, a pair of laterally spaced plate members fixedly secured to a portion of said lift bar intermediate said forward beam portions for lateral adjustment along said bar, a longitudinally adjustable beaming member having its rear end pivotally connected with said frame for adjustment laterally and having its other end pivotally connected with a portion of said part above said lift bar, a forwardly extending pull bar adapted for connection with the tractor and having its rear end disposed between said plate members and connected therewith through means affording limited relative horizontal angular movement of said bar with respect to said members, and additional means carried by said plate members securing said bar in any selected angular position relative to said plate members.

6. In combination with a tractor having a transversely extending rear mounted rock shaft provided with a pair of laterally spaced lift arms extending rearwardly therefrom, means for actuating said rock shaft, and having a draft element detachably connectable with the forward end of an implement pull bar, an attached implement comprising a transverse lift bar having its opposite ends detachably connected with said lift arms, a rigid implement frame presenting laterally spaced parallel forward beam portions secured to an intermediate portion of said lift bar for lateral adjustment therealong, a rigid part fixedly secured to a portion of said lift bar intermediate said forward beam portions for lateral adjustment along said bar, and a forwardly extending generally rigid pull bar having its front end pivotally connected with said draft element and having its rear end secured to said rigid part through means affording limited horizontal angular adjustment thereof relative to said part.

WILLARD H. TANKE.

References Cited in the file of this patent

UNITED STATES PATENTS

| Number | Name | Date |
|---|---|---|
| 1,831,997 | Brown | Nov. 17, 1931 |
| 2,420,530 | Evans | May 13, 1947 |
| 2,505,580 | Todd | Apr. 25, 1950 |
| 2,505,609 | Ego | Apr. 25, 1950 |